(12) United States Patent  
Lenz et al.

(10) Patent No.: US 9,417,096 B2  
(45) Date of Patent: Aug. 16, 2016

(54) ROTATION DIRECTION DETECTION OF AN IGNITION DEVICE

(71) Applicant: PRUEFREX engineering e motion gmbh & co. kg, Cadolzburg (DE)

(72) Inventors: Denis Lenz, Fuerth (DE); Stanislaw Cichon, Fuerth (DE); Leo Kiessling, Cadolzburg (DE)

(73) Assignee: PRUEFREX engineering e motion GmbH & Co. KG, Cadolzburg (DE)

( * ) Notice: Subject to any disclaimer, the term of this patent is extended or adjusted under 35 U.S.C. 154(b) by 245 days.

(21) Appl. No.: 14/074,210

(22) Filed: Nov. 7, 2013

(65) Prior Publication Data

US 2014/0125329 A1     May 8, 2014

(30) Foreign Application Priority Data

Nov. 7, 2012   (DE) .......................... 10 2012 021 662

(51) Int. Cl.
| | |
|---|---|
| *G01D 5/14* | (2006.01) |
| *G01D 5/20* | (2006.01) |
| *F02P 1/08* | (2006.01) |
| *F02P 11/02* | (2006.01) |

(52) U.S. Cl.
CPC . *G01D 5/14* (2013.01); *F02P 1/083* (2013.01); *F02P 11/02* (2013.01); *G01D 5/2033* (2013.01)

(58) Field of Classification Search
CPC ......... G01D 5/14; G01D 5/2033; F02P 1/086; F02P 11/02; F02P 5/1506; F02P 3/0846; F02P 3/06; F02P 11/025; F02D 2400/06; F02N 2250/04

See application file for complete search history.

(56) References Cited

U.S. PATENT DOCUMENTS

| | | | |
|---|---|---|---|
| 4,722,311 A | 2/1988 | Erhard | |
| 2009/0084368 A1* | 4/2009 | Kiessling | ................ F02P 1/086 123/601 |

FOREIGN PATENT DOCUMENTS

| | | |
|---|---|---|
| CN | 1667253 A | 9/2005 |
| CN | 101210936 A | 7/2008 |
| DE | 36 08 740 A1 | 10/1987 |
| EP | 1 574 692 A1 | 9/2005 |

OTHER PUBLICATIONS

Chinese Office Action for Chinese Application No. 201310551783.8 dated Jan. 18, 2016, with English translation.

\* cited by examiner

*Primary Examiner* — Son Le  
(74) *Attorney, Agent, or Firm* — Muncy, Geissler, Olds & Lowe, P.C.

(57) ABSTRACT

A first voltage signal and a second voltage signal each with positive and negative half waves are generated for rotation direction detection during the operation of an ignition device for an internal combustion engine by a rotating magnet wheel in at least two coil arrangements, which are arranged on adjacent core legs of an iron core, whereby the rotation direction of the magnet wheel is determined from a time offset or angular offset of at least one half wave of the first voltage signal relative to a half wave of the second voltage signal.

10 Claims, 5 Drawing Sheets

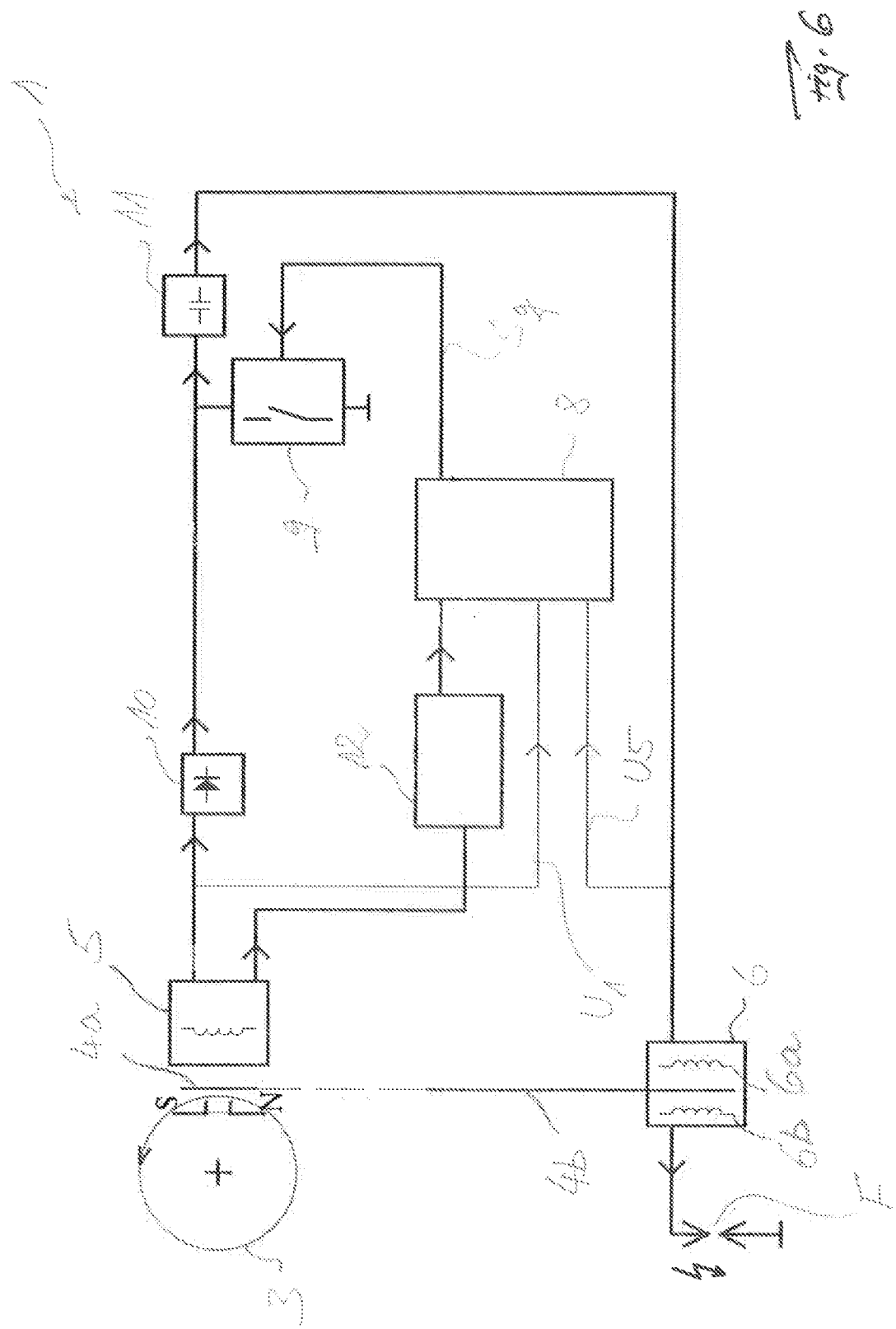

ROTATION DIRECTION DETECTION OF AN IGNITION DEVICE

This nonprovisional application claims priority under 35 U.S.C. §119(a) to German Patent Application No. DE 10 2012 021 662.9, which was filed in Germany on Nov. 7, 2012, and which is herein incorporated by reference.

BACKGROUND OF THE INVENTION

1. Field of the Invention

The present invention relates to a method for detecting a rotation direction of an ignition device during an operation of the ignition device, particularly a magneto ignition unit or device for an internal combustion engine.

2. Description of the Background Art

Such ignition devices are typically used in a hand-guided tool with a combustion engine as the internal combustion engine. To make sure that no ignition spark forms in a reverse operation of the combustion engine and thus to protect the internal combustion engine operated with such an ignition device from a reverse operation. It is known, for example, from DE 36 08 740 A1, which corresponds to U.S. Pat. No. 4,722,311, to provide a rotation direction detector for detecting the rotation direction, which is intended in the case of a wrong rotation direction of the engine to prevent the discharging of ignition pulses. For realization, electronics are proposed for determining the number of positive and negative half waves induced in a generator electromagnet (magnetic generator).

In the conventional structure of such an ignition device with a magnet wheel coupled to the combustion engine, for example, to its crankshaft, and with a typically U-shaped iron core with a coil (charging and/or ignition coil) arranged on at least one of its core legs, an induced voltage results in the coil depending on the rotation direction of the magnet wheel provided with permanent magnets, whereby the coil voltage has negative and positive half waves.

In the conventional ignition device, the electronics infer the rotation direction of the magnet wheel from the number of the positive and/or negative half waves. As in prior concepts of rotation direction detection or for other purposes, for example, for determining the angular positions and for possible signal processing, active components, particularly transistors, are employed in the conventional device as well.

SUMMARY OF THE INVENTION

It is therefore an object of the present invention to provide a method for rotation direction detection with especially simple means. In particular, in an embodiment, only already present signals are to be used for rotation direction detection. Furthermore, an ignition device operating accordingly is to be provided, in which for this purpose no additional components, particularly no active components such as, for example, transistors, are employed.

To this end, it is provided according to an embodiment of the invention to determine a rotation direction from a time offset or angular offset or a corresponding displacement of at least one half wave of a first voltage signal relative to a half wave of a second voltage signal, whereby the voltage signals are generated or taken off by coils or coil arrangements, which are arranged on an adjacent, preferably U-shaped iron core.

Specifically, the method for detecting the rotation direction during the operation of an ignition device provides for the generation of a first voltage signal and a second voltage signal with positive and negative half waves each by means of a rotating magnet wheel in at least two coil arrangements, which are arranged on adjacent core legs of an iron core, and for the determination of the rotation direction of the magnet wheel from a time offset or angular offset or from a time or angular displacement of at least one half wave of the first voltage signal relative to a half wave of the second voltage signal.

The signal generation occurs during the rotation of the magnet wheel, which is coupled rotationally fixed with the crankshaft of the combustion engine or the internal combustion engine. A magnet arrangement with a magnetic north pole and with a magnetic south pole is arranged in a circular sector or segment of the magnet wheel. If the magnetic poles during the rotation of the magnet wheel successively sweep over the two spaced-apart, stationary core legs, the magnetic field flows through the coils arranged thereon correspondingly offset in time. As a result, a current is induced in the coils, which supplies a correspondingly tappable coil voltage with temporally sequential positive and negative half waves.

The voltage half waves of these signal voltages each have opposite polarities depending on the rotation direction of the magnet wheel. Because the coils are arranged spatially spaced apart from one another, the voltage signals and thereby their individual half waves occur with a time offset or with an angular offset due to the geometric arrangement.

In an embodiment, the invention therefore is based on the realization that this time offset (time displacement) or angular offset (angular displacement) is representative of the rotation direction of the magnet wheel. The running direction or rotation direction of the magnet wheel can therefore be determined based on the displacements or the offset in the voltage signals of the coils arranged depending on the core position. These displacements or a characteristic offset at exposed points of the signals or their half waves can be determined at different angular positions and via time components or via differences in voltage levels.

Thus, advantageously different slopes particularly of the rising flanks of the individual half waves of the signals of the particularly two coils on the specific core legs can be evaluated and the rotation direction can be determined therefrom. The evaluation can occur preferably during the zero crossings of these two signals or in time immediately after the crossings. In this regard, preferably exceeding or falling below a threshold is determined as a function of the time (angular position). This exceeding or falling below a threshold moreover can be put in relation to certain amplitude values of certain half waves, particularly to increase the reliability of the rotation direction detection. For example, the falling below a threshold value of the voltage signal of one of the coils can be detected or determined at the same time with a sampling of the amplitude value of the voltage signal of the other coil and be subjected to a causality or correlation test, and the rotation direction can be detected or determined based on the result of this test.

As has been realized, the signal curves and particularly the shapes, amplitudes, time intervals, and/or rise times of the flanks of the half waves of the particular voltage signals are characteristic for the structure of the particular coils and/or the shapes or dimensions of the two associated core legs of the iron core. Depending on the rotation direction of the magnet wheel, therefore certain half waves of the particular voltage signal are expected in specific sequences. The time offset of the occurrence, particularly the times of the zero crossings, of characteristic half waves thus is a reliable indicator of the rotation direction of the magnet wheel and is used therefore according to the invention for rotation direction detection or determination.

The rotation direction of the magnet wheel can therefore be determined from the time offset or angular offset of at least one of the positive and/or one of the negative half waves of the first voltage signal relative to a corresponding positive or negative half wave of the second voltage signal. In this regard, a deviation of the voltage value of the voltage signal or each voltage signal, particularly one of its half waves, from a threshold value, preferably a falling below a threshold value, is used suitably for rotation direction detection. Preferably, the time of a detected or determined deviation of the voltage value of the voltage signal or each voltage signal, particularly one of its half waves, from a threshold value, preferably a falling below a threshold value, is used for rotation direction detection.

In an embodiment, the time of a detected or determined deviation of the voltage value of one of the voltage signals from a threshold value and the time of a detected or determined deviation of the voltage value of the other voltage signal from a threshold value are put in relation to one another and their time offset or time offset direction is used for rotation direction detection.

Specifically, the time of a detected or determined falling below a threshold of the voltage value of a half wave of one of the voltage signals and the time of a detected or determined falling below a threshold of the voltage value of a half wave of the other voltage signal are suitably put in relation to one another for rotation direction detection.

According to an embodiment, the voltage signals are supplied to a control or regulating device, particularly a microprocessor, to evaluate the time or angular offset. It is also expedient that a synchronization occurs based on characteristic voltage, amplitude, level, and/or time features of the voltage signals, particularly for determining and/or ensuring the or an angular position of the magnet wheel.

The advantages achieved with the invention include particularly in that the rotation direction can be determined reliably and in an especially simple manner from the time occurrence of such characteristics of the individual half waves of the two voltage signals.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 6 is a block diagram according to FIG. 3 of an ignition device with a charging coil and ignition transformer (without a trigger coil).

DETAILED DESCRIPTION

Figure 1:
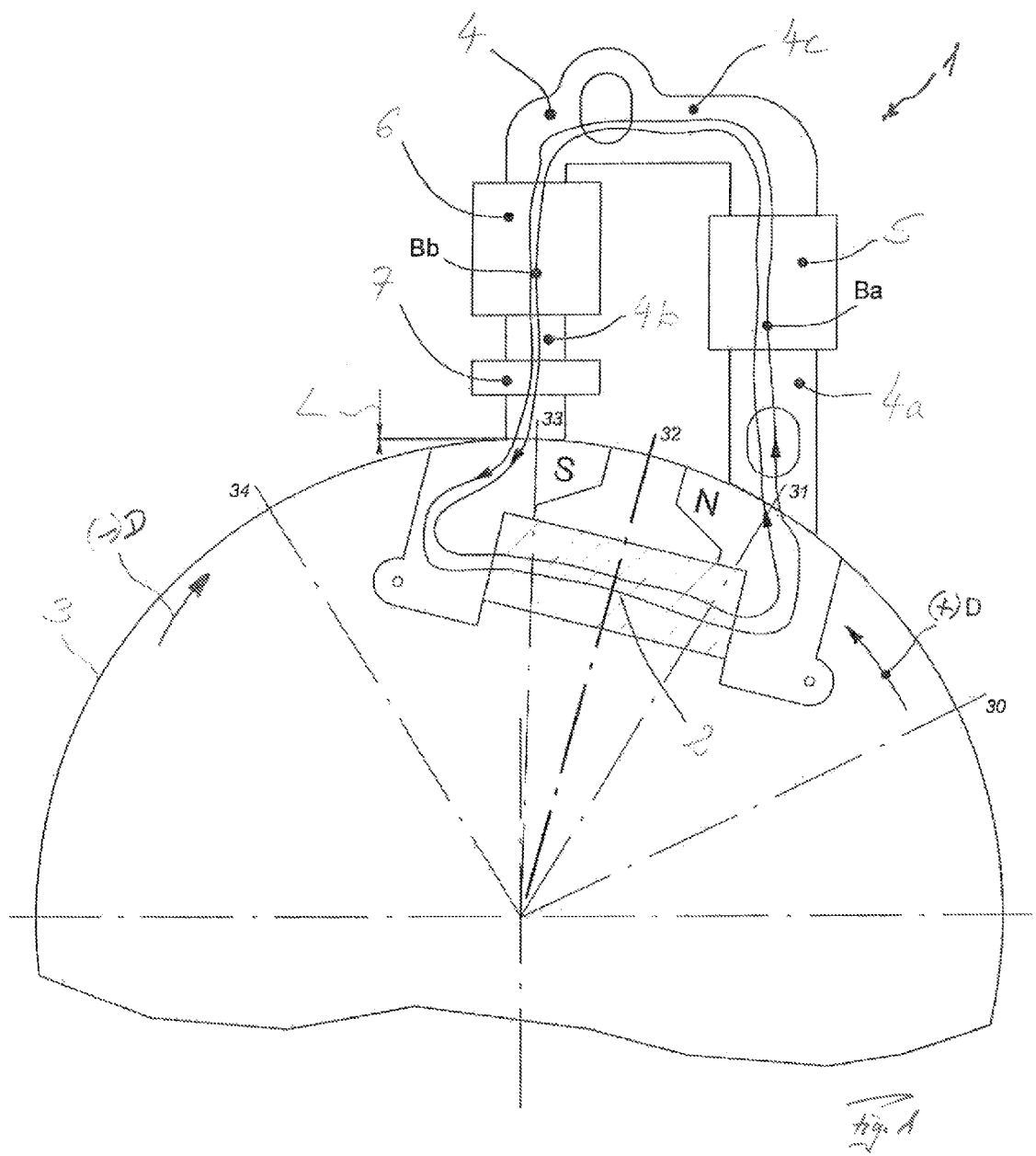
FIG. 1 is a schematic of an ignition device with a U-shaped iron core with coils arranged thereupon and having a magnet wheel.

FIG. 1 shows schematically an ignition device 1 with a magnet wheel 3 which has a magnet 2 with a north and south pole (N, S) and rotates synchronously with a combustion engine (internal combustion engine) (not shown in greater detail). The permanent magnet 2 is arranged in a circular sector or in a circular segment of the circular magnet wheel 3. Ignition device 1 moreover has a stationary, U-shaped iron core 4 with a first core leg 4a and with a second core leg 4b. The two core legs, spaced apart from one another, are connected together by a middle part 4c.

An air gap L is formed between the free ends of core legs 4a, 4b and magnet wheel 3. The distance or the arrangement of core legs 4a, 4b is matched to the dimensions or to the arrangement of magnet 2. In this case, in the illustrated rotary position of magnet wheel 3, the magnetic flux Ba, Bb, drawn in the shape of two closed lines and arrowheads, is closed via iron core 4.

A charging coil 5 is arranged on core leg 4a; due to the magnetic flux Ba a current is induced in the coil winding thereof, whereby a corresponding voltage is tappable as first voltage signal U1 at the coil winding or its winding ends. Analogously, an ignition transformer 6, frequently also called an ignition coil, in whose primary winding 6a (FIG. 3) a current is also induced and accordingly a voltage U5 is tappable, is arranged on the adjacent core leg 4b. In addition, a trigger coil 7 is arranged on this second core leg 4b, which supplies a voltage as a second voltage signal U2. If such a trigger coil 7 is not provided (FIG. 6), the second voltage signal U2 is supplied by primary winding 6a of ignition transformer 6.

Figure 2:
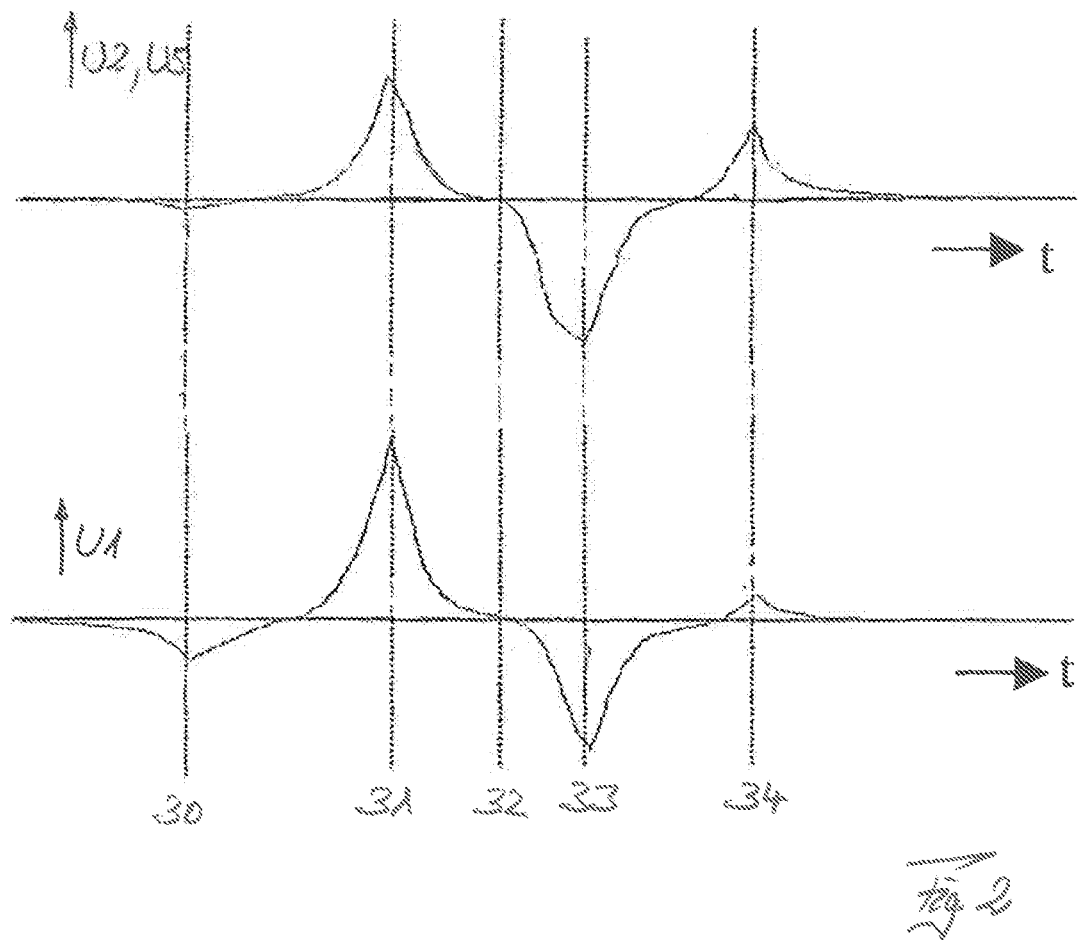
FIG. 2 is a time curve of two voltage signals of coils arranged on different core legs of the iron core.

FIG. 2 in the bottom diagram shows the time curve of the first voltage signal U1 and in the top diagram the time curve of the second voltage signal U2, U5. The time curve of the two voltage signals U1 or U2, U5 corresponds to the counterclockwise rotation direction D, drawn in FIG. 1, (forward direction) of magnet wheel 3.

Recognizably, both signals U1 and U2, U5 have a sequence of negative and positive half waves. The maxima or minima of these two voltage signals U1 and U2, U5 correlate with angular positions 30 to 34 drawn in FIG. 1, whereby the zero crossing between the two middle half waves, i.e., the two pronounced positive and negative half waves, is designated by the angular position 32.

Figure 3:
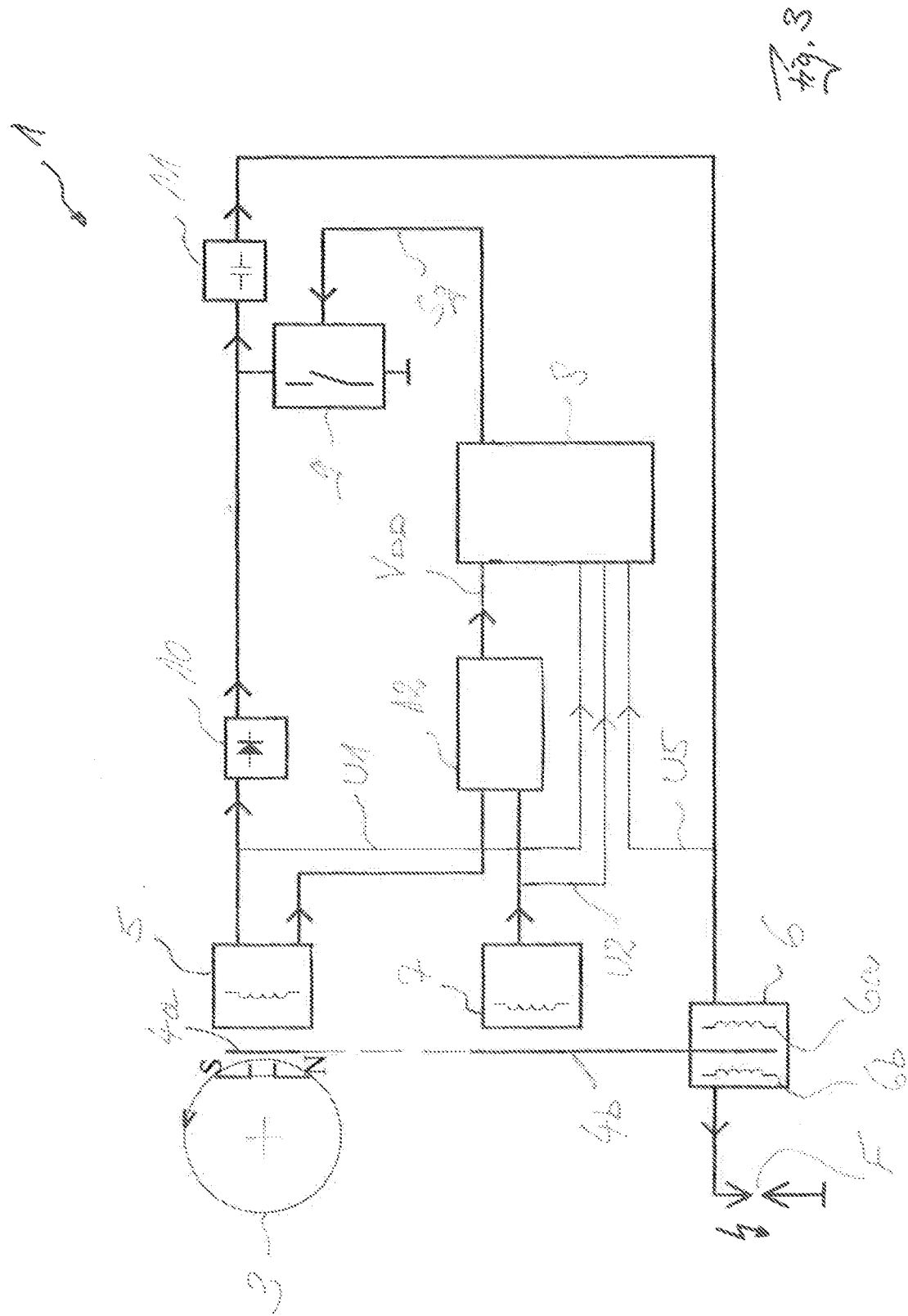
FIG. 3 is a block diagram of the ignition device with a control and/or evaluation device for rotation speed detection with a charging coil, trigger coil, and ignition transformer (primary winding)

FIG. 3 shows ignition device 1 or its circuit component in a block diagram. Ignition device 1 comprises a control and/or regulating unit 8, particularly in the form of a microcontroller or microprocessor, which on the output side is connected on the control side to an ignition switch 9 in the form of a semiconductor switch, for example, a TRIAC, which for its part is connected to ground.

Charging coil 5 is connected via a rectifier 10, for example, in the form of a diode or a half or full bridge rectifier to an ignition capacitor 11, which for its parts is connected to primary winding 6a of ignition transformer 6. On the secondary side, ignition transformer 6 with its secondary winding 6b is run to a terminal (not described in greater detail) of ignition device 1, to which, for example, the spark plug for generating an ignition spark F for the combustion engine (internal combustion engine) can be or is connected.

Ignition switch 9 is closed after an ignition or control signal $S_g$ generated by microcontroller 8 at a specific, adjustable ignition time. As a result, ignition capacitor 11 is discharged via primary coil 6a of ignition transformer 6, which because of the winding relationship of primary coil 6a to secondary coil 6b on the secondary side leads to a corresponding, sufficient high voltage for triggering the ignition spark F.

To supply power and provide the supply voltage $V_{DD}$ for microprocessor 8, a current/voltage source 12 (power supply) is fed in terms of power by charging coil 5 and/or trigger coil 7. On the input side, voltage signal U1 of charging coil 5 and voltage signal U2, U5 of trigger coil 7 or ignition transformer 6 are supplied to microprocessor 8.

If according to the embodiment after FIG. 6 no additional trigger coil is present, voltage signal U1 of charging coil 5 and voltage signal U5 of primary winding 6a of ignition transformer 6 are supplied to the microcontroller. Based on these two voltage signals U1, U5 (or U2), microprocessor 8 determines the rotation direction (+)D or (−)D of magnet wheel 3.

The rotation direction detection occurs based on an analysis of the two voltage signals U1, U2 (U5) with respect to their rotation direction-dependent time course. In particular, the time occurrence of a characteristic feature of one of the voltage signals U1, U2 (U5) is compared with or put in relation to a time occurrence of a characteristic feature of the other voltage signal U1, U2 (U5).

Figure 4:
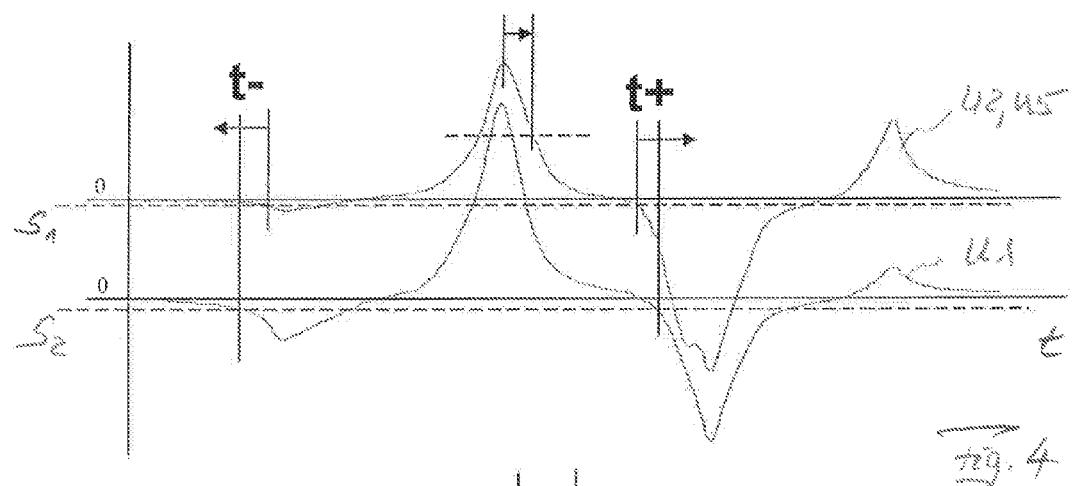
FIG. 4 is a time curve of both signals in a first rotation direction (forward direction) of the magnet wheel.
Figure 5:
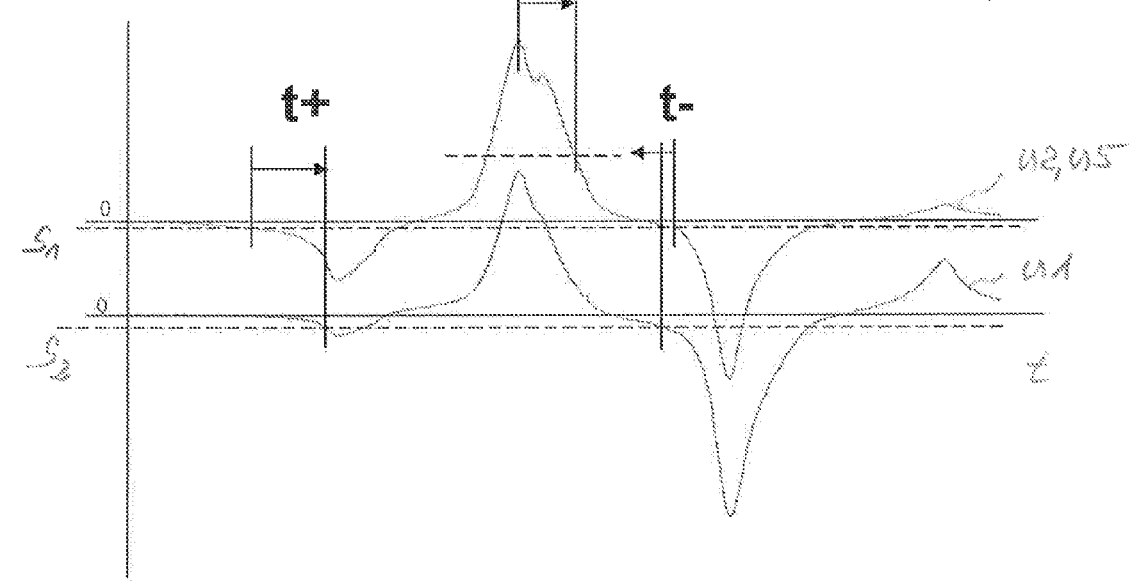
FIG. 5 is an illustration according to FIG. 4 of the signal curve in the opposite rotation direction (reverse direction)

Thus, FIG. 4 shows characteristic time displacements $t_{(−)}$ and $t_{(+)}$ of the occurrence of a falling below a threshold value of the temporally first (negative) half wave of the particular voltage signal U1, U2 (U5) in the case of the rotation direction (+)D (forward), whereas FIG. 5 describes the time relationships or displacements in the case of the opposite rotation direction (−)D of magnet wheel 3 (reverse). The particular threshold values are designated with $S_1$ and $S_2$.

If in terms of time first the displacement or the time offset $t_{(−)}$ occurs during the first negative half wave and at a later time the falling below the threshold value with a here positive time displacement $t_{(+)}$, the forward rotation direction (+)D is detected. If similarly following the falling below the threshold value of the negative half waves first a positive time offset $t_{(+)}$ and later with a further falling below the threshold value a negative time offset $t_{(−)}$ occur, the reverse rotation direction (−)D is detected. Therefore, the output of the ignition or control signal $S_g$ to ignition switch 9 is prevented.

In addition or alternatively, the different rise times (slopes) of the individual half waves of the voltage signals can be evaluated with respect to the rotation direction detection. The falling below one of the voltage signals U1, U2 (U5) of one of the corresponding threshold values $S_1$, $S_2$ in conjunction with the determination and evaluation of the amplitude and/or a level of a corresponding half wave of the other voltage signal U1, U2 (U5) can also be used for rotation direction detection. The threshold values $S_1$, $S_2$ in this case are suitably calculated or determined in such a way that in the case of a rotation direction reversal the sign of the time offset $t_{(\pm)}$ changes.

Also by means of microprocessor 8 or an additional circuit, the amplitudes of the voltage signals can be adjusted by a voltage divider, for example, a series connection of ohmic resistors, so that the relevant signal levels of the voltage signals U1, U2 (U5) fall within the measuring range of microprocessor U8 [sic, 8] and the maximum amplitudes are at similar levels. This can take into account that the different coils 5, 6, 7 have different winding numbers.

The voltage divider here can be designed in such a way that the maximum peak or level of the voltage generated by core leg 4a (charging coil 5) in the rotation direction (+)D (forward) corresponds, for instance, to the maximum peak or level of voltage signal U2, U5 generated by the other core leg 4b (trigger coil 7 or primary winding 6a) in the opposite rotation direction (−)D (reverse).

Overall, the time offset or the time displacement of the voltage signals generated by core legs 4a and 4b is used for rotation direction detection and evaluated, preferably by means of one or more threshold switches, analog-to-digital converters, and/or a digital control unit or a controller. In this case, particularly the time reference in the case of falling below a threshold value $S_1$, $S_2$ is used, preferably in conjunction with an amplitude, level, or peak evaluation of certain half waves of the voltage signals.

The invention is not limited to the exemplary embodiments described above. Rather, other variants of the invention can also be derived herefrom by the person skilled in the art, without going beyond the subject matter of the invention. Particularly, all individual features described in relation to the exemplary embodiments can also be combined with one another in a different manner, without going beyond the subject matter of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for detecting a rotation direction during an operation of an ignition device for an internal combustion engine, the method comprising:
   generating a first voltage signal and a second voltage signal with positive and negative half waves via a rotating magnet wheel in at least two coil arrangements that are arranged on adjacent core legs of an iron core; and
   determining the rotation direction of the magnet wheel from a time offset or angular offset of at least one half wave of the first voltage signal relative to a half wave of the second voltage signal.

2. The method according to claim 1, wherein the rotation direction of the magnet wheel is determined from the time offset or angular offset of at least one of the positive and/or one of the negative half waves of the first voltage signal relative to a corresponding positive or negative half wave of the second voltage signal.

3. The method according to claim 1, wherein a determined deviation of the voltage value of one of the half waves of the first and/or second voltage signal from a threshold value is used for the rotation direction detection.

4. The method according to claim 1, wherein a time of a determined deviation of the voltage value of one of the half waves of the first and/or second voltage signal from a threshold value is used for rotation direction detection.

5. The method according to claim 1, wherein a time of a determined deviation of the voltage value of one of the half waves of one of the voltage signals from a threshold value and a time of a determined deviation of the voltage value of one of the half waves of the other voltage signal from a threshold value are put in relation to one another and their time offset or time offset direction is used for rotation direction detection.

6. The method according to claim 1, wherein the voltage signals are supplied to a microprocessor for evaluating the time offset or angular offset.

7. The method according to claim 1, wherein a synchronization for determining and ensuring an angular position of the magnet wheel occurs based on characteristic voltage, amplitude, level, and/or time features of the voltage signals.

8. An ignition device for an internal combustion engine for carrying out the method according to claim 1, the ignition device comprising:
- a rotating magnet wheel;
- a magnet arranged in a circular sector of the rotating magnet wheel;
- at least two coil arrangements, which are arranged on adjacent core legs of an iron core disposed on the rotating magnet wheel, wherein the coil arrangements are configured to generate a first voltage signal and a second voltage signal with positive and negative half waves; and
- a control or regulating device to detect a rotation direction of the rotating magnet wheel by evaluating a time offset or angular offset at least one half wave of the first voltage signal relative to half wave of the second voltage signal.

9. The ignition device according to claim 8, wherein an air gap is formed between the free ends of the core legs and the magnet wheel.

10. The ignition device according to claim 8, wherein a distance between the core legs is matched to the dimensions of the magnet.

\* \* \* \* \*